Patented Nov. 7, 1922.

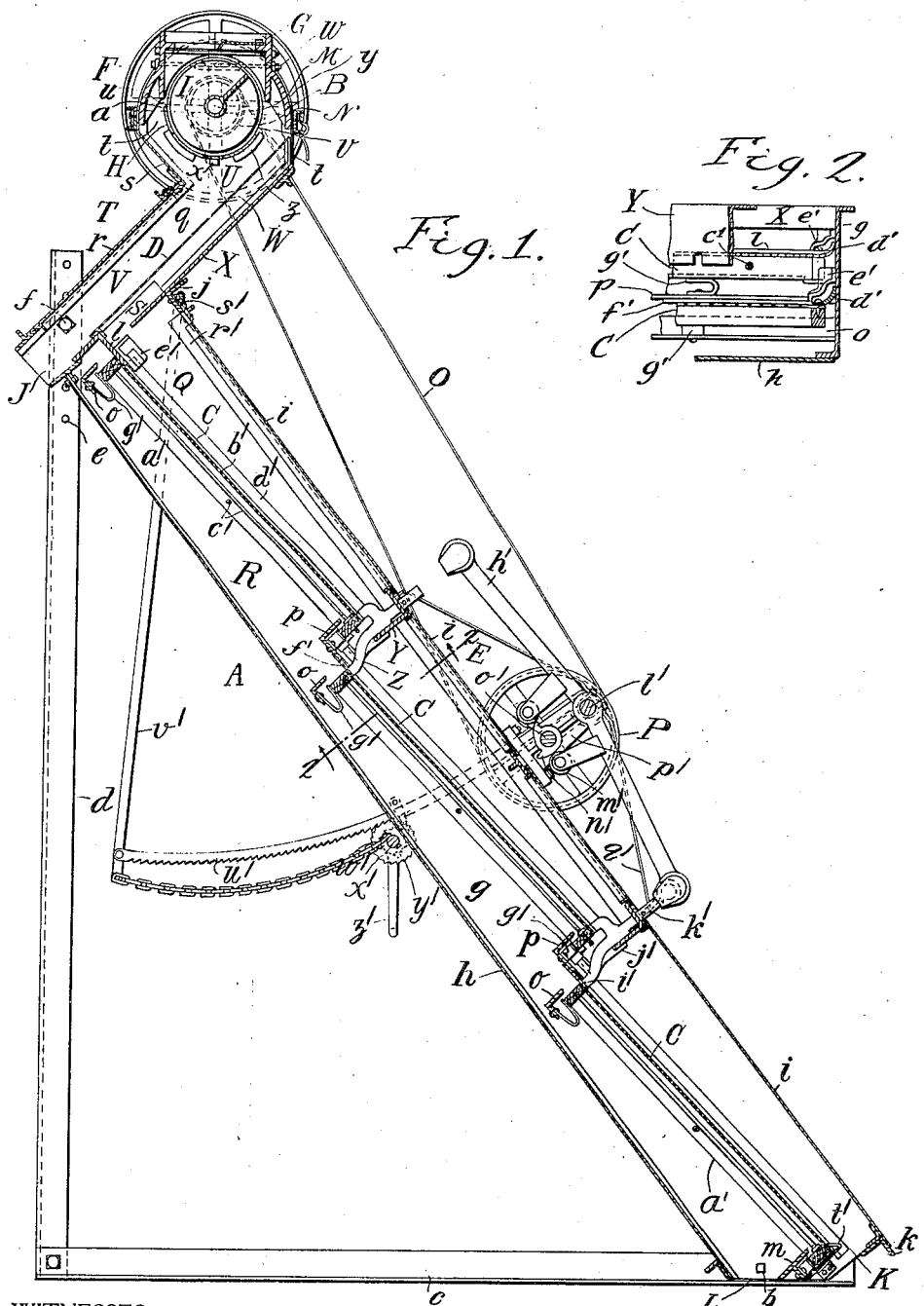

1,434,691

UNITED STATES PATENT OFFICE.

GEORGE HOLT FRASER, OF BROOKLYN, NEW YORK.

SCREEN OR SEPARATOR.

Application filed July 13, 1915. Serial No. 39,589.

*To all whom it may concern:*

Be it known that I, GEORGE HOLT FRASER, a citizen of the United States of America, residing in the borough of Brooklyn, county of Kings, city and State of New York, have invented certain new and useful Improvements in Screens or Separators, of which the following is a specification.

This invention relates to screens or separators of the type in which an inclined screen, down which the material flows by gravity, is used to separate the fine material from the coarse, and aims to provide certain improvements in machines of this type.

Heretofore it has been common to distribute material over the top of an inclined screen and to vibrate the screen to prevent clogging of its meshes. A scalping screen has been placed over the fine screens to prevent large pieces from injuring the latter. It has been found that such a scalping screen interferes with access to, and removal of, the fine screens, and that the material flowing down the screens accelerates in speed until its speed of flow exceeds that at which the screens can work efficiently.

This invention aims to provide a simple construction in which the scalping screen shall be so placed as not to interfere with access to, or observation of, the fine screens; in which too rapid downflow of material will be prevented; in which the fine screens can be jarred, and in which the removal of the fine screens can be easily effected.

To this end in carrying out the present invention in its preferred form, I provide a rotary distributor for spreading the material in a wide thin stream, a rearwardly inclined scalping screen, a fine screen or screens reversely inclined to the scalping screen and disposed in a plurality of steps or successive planes one following the other, and I provide dams or intercepting means for checking the flow of material from one fine screen to the next so that it will be retarded in its descent, and I provide a jarring means for the fine screens, and I mount the dams or jarring means movably or removably above the fine screens so that they can be swung or moved upwardly away from the latter and the main frame or casing to remove them from above the fine screens. I also provide movable or removable covers for the casing, and various details of improvement, all of which will be hereinafter more fully set forth with reference to the accompanying drawings, in which Fig. 1 is a vertical cross-section of a screen or separator embodying the preferred form of my improvements, and Fig. 2 is a fragmentary cross-section thereof cut approximately on the lines 2—2 and looking in the direction of the arrow.

Referring to the drawings, A is the main frame or casing, B is the feeder or distributor, C C are the fine screens, D is the scalping screen, E is the jarring mechanism, and F is the driving pulley. G is the feed hopper, H is the feed trough, I is the distributing conveyor, J is a coarse outlet, K is the tailings outlet, and L is the fine outlet.

These parts may be of any usual or suitable construction which will serve to distribute the material in a wide thin stream and effect the desired separations. As shown, the driving pulley F is mounted on a driving shaft M, which carries the conveyor I for revolving the latter to distribute the material longitudinally from the hopper G at one end of the separator throughout the length of the trough H and discharge it over the inclined edge $a$ of this trough in a wide thin stream from end to end. The shaft M carries a pulley N from which a belt O extends to the driving pulley P of the jarring mechanism for driving the latter. The material flows down the coarse screen D, the coarse pieces escaping through the outlet J, and material fine enough to pass through the screen flows on to the fine screen or screens C, down which it flows, the coarse tailings passing over the fine screens to the outlet K and the fine material passing through the fine screens flowing to the outlet L.

In the construction shown in the drawing, the casing A is adjustable as to inclination by being pivotally mounted on a pin $b$ on feet $c$ and legs $d$, which latter have holes $e$ in any one of which the casing may be supported to give the desired inclination by bolts $f$. The casing shown comprises an open top member having sides $g$, a closed bottom or fixed wall $h$, and movable or removable top covers $i$. Its sides are connected together at the front by a top bar $j$ and a bottom bar $k$ spaced apart sufficiently to provide an uninterrupted top opening through which the dams and jarring mechanism may be moved, and through which the screens may be removed or inserted.

The upper end of the casing is provided with a cross bar or plate $l$ serving as a feed plate or shelf above the fine screens, and the lower end is provided with a cross bar or T $m$ serving as a partition between the coarse and fine outlets. Beneath the screens the casing is provided with cross bars or members $o$ and $p$ from which the fine screens are supported. The members $o$ and $p$ are preferably fixed to the sides $g$ of the casing in any usual or suitable way, and each is preferably mounted in fixed relation both to the sides and to the bottom or fixed wall $h$ of the casing. Each preferably affords a support for an adjacent screen C, which is preferably yieldingly mounted thereon through the medium of an intermediate spring $g'$. Each member $p$ preferably projects below the screen it sustains and serves as a shelf for receiving, retarding and diverting material flowing over such screen, as well as a means for positioning the succeeding screen against the upward stress of the spring sustaining it.

The casing affords a screening chamber Q above the fine screens and a dust chamber R below these, and the upper end of the casing is open to afford an inlet S for receiving intermediate material from, and adapted to be connected with, the housing T of the feeding or distributing means.

The housing T is preferably a tubular casing affording a feeding chamber U, a coarse chamber or duct V, and a middlings chamber or passage W between which the inclined scalping screen D is interposed. This housing preferably consists of end pieces or brackets $q$, bottom wall or plate X, and a movable or removable door $r$.

According to one feature of this invention, the scalping screen D is mounted above and reversely inclined to the fine screens, so that its tailings may be removed back of these and the space above the fine screens may be unobstructed. As shown, this is accomplished by mounting the scalping screen in the tubular housing T and providing a downwardly and rearwardly inclined coarse outlet and middlings conduits extending at right angles to and above the fine screens, the coarse outlet discharging above the screening chamber R and the middlings conduits discharging on to the feed plate $l$ through the mouth S of the casing A under the lower edge of the rearwardly inclined fixed bottom wall or front board X and above the upper edge of the fine screens, to deliver the middlings into the screening chamber Q. As shown, the housing T is separably connected to the casing A and closes the upper end thereof.

According to another feature of improvement, the upper cross bar $l$ affords a support for the lower edge of the coarse screen D in two downward directions throughout the width of this screen and removably sustains the lower edge of this screen, and preferably consists of an angle, the downwardly and forwardly extending leg of which overlaps the upper edge of the fine screen C and has a recess $e'$ at each end for receiving the edges $d'$ of the fine screen, and serves to close the space between the coarse screen and the upper edge of the fine screen to prevent leakage above the latter, while the downwardly and rearwardly inclined leg of the bar $l$ serves to close the space above the fine screen between the lower edge of the coarse screen and the tailings outlet J, to prevent leakage of coarse tailings into the fine chamber, the space beneath these legs affording a recess for removably receiving the upper edge of the fine screen C, and in which the latter is removably mounted as by being slid upwardly on the springs $g'$ disposed in this recess for resiliently sustaining the fine screen therein with a stress toward the overlapping bar or stationary shelf $l$.

According to another feature of improvement, the feed chamber of the housing T is enlarged, preferably by having a rear reversely inclined feed wall $s$, and the revolving distributor I is mounted intermediate of the front and rear walls of the chamber U so that it can discharge forwardly or rearwardly over the trough H, and the distributing conveyor is reversible and can be driven in either direction, and the hopper G is reversible and can be placed at either end of the housing, so that material can be fed longitudinally of the trough in either direction, and the trough can be adjusted accordingly. The trough is preferably a curved sheet which can be distorted to change the inclination of its edge to secure a uniform distribution of material over it, and the front and rear walls of the housing are spaced apart from the trough to afford passages $t$ in front and rear through which material can fall. The screen D extends beneath the trough at the front side, and the wall $s$ extends beneath it at the rear side and deflects rearwardly fed material forwardly onto the screen, so that material flows on to the scalping screen when the conveyor I is driven in either direction. Preferably, the hopper G is vertically divided and the two halves are separably connected together and to the housing so that either half can be removed horizontally, and the end pieces or brackets $q$ are horizontally divided on a line coincident with the axis of the conveyor, and comprise removable top parts $u$, which afford carrying caps for the driving shaft, and which can be removed to facilitate removal of the latter. A disk $v$ holds the trough in place and is adjusted by screws $w$ to tilt the trough, which has a notch engaged by a lug $x$ on the disk. This disk serves as a wear plate to protect the adjacent bracket. A hinged cover $y$ is reversibly and removably mounted on the top of the housing. Arc-shaped flanges $z$ support the trough so it can be adjusted. The screen D is made in sections and can be removed through the back door $r$, and is loosely or removably mounted.

According to one feature of improvement, the fine screen or screens comprises two or more screening surfaces in different planes, resiliently mounted, provided with an interceptor or dam Y, and jarred by impact members or posts Z. As shown, each screen consists of a separate removable rectangular frame $a'$ on which is fastened wire mesh screening clothing $b'$, which is positively stretched by adjustable rods $c'$ extending through the frame and having a projecting end in front by which they can be turned to stretch the cloth. These rods are below and spaced apart from the cloth, and their ends are accessible under the dams. The ends of each screen frame are provided with an upwardly extending yielding flange or elastic guard $d'$ of rubber or metal, which is fastened to the frame and movably and removably bears or presses against the adjacent side $g$ to make a tight joint, but permits the screen to be lifted bodily out of the casing. The upper end of this guard enters a socket $e'$ provided to receive it at each end of each shelf and which prevents leakage under the guard. A feed plate $f'$ may be fastened on the upper edge of the screen frames.

Each screen is preferably mounted on a spring $g'$ which presses it upwardly. These springs are mounted on the bars $o$ and $p$, and those under the top edge of the screen extend downwardly to permit the upper end of the screen to be slid into position so that its top edge or plate will pass under the adjacent cross bar, which serves as a re-feeding plate, receiving material intercepted and deflected downwardly by the dam and refeeding it to the next screen, while the springs $g'$ under the lower edge of each screen extend transversely of the casing. The screens are spaced apart from the dam so as to afford a re-feeding passage below the edge of an upper screen and above the face of the next lower screen.

Preferably, the impact members are posts Z which engage the edges of two adjacent screens and serve as abutments for arresting their upward movement and positioning them upwardly, as well as anvil blocks or members for transmitting to them the impactive jarring of the strikers or hammers $h'$ of the jarring mechanism. As shown, the posts Z are slidingly mounted on the dams Y and are movable or removable therewith. Preferably, each post has feet $i'$ engaging the screens, a hook $j'$ engaging a notch in the dam, and a head $k'$ passing through a hole in the dam and exposed above for receiving the impact of the hammer, and each is separably and movably connected to its dam, and resists the upward stress of the screen supporting springs when in its working position.

The jarring mechanism P preferably comprises a plurality of gravity hammers fulcrumed on a shaft $l'$ and having rollers $m'$ engaged by cams $n'$ mounted on a shaft $o'$ and revolved by the pulley P to alternately raise and drop the hammers. These shafts are mounted in brackets $p'$, and the hammer shaft $l'$ is supported intermediate of its ends from two adjacent dams by a brace $q'$ which permits movement or removal of the small covers $i$ beneath the jarring mechanism and is out of the path of the covers $i$ above and below this mechanism.

According to another feature of improvement, the dams and jarring mechanism and the posts are movably or removably mounted to swing as a group away from the casing to expose the fine screens. As shown, these are mounted on a rectangular frame $r'$ hinged to the casing at $s'$ and comprising the two dams Y, and two upwardly extending end bars which are hinged at their tops and on which the brackets $p'$ are mounted, so that by swinging up this frame all the connected parts will be lifted out of the way. The covers $i$ may be removed before swinging up this frame, or the upper ones may move with it. Lifting means for these parts are provided, as shown.

The lower screen frame is held down by a spring stop or catch $t'$, and the several screen sections are prevented from sliding forwardly by the pieces $e'$ in front of them which serve as stops for arresting downward movement of the screens.

In operation, material entering the hopper G at either end of the separator will be distributed over the edge of the trough in a wide thin stream and will flow down the scalping screen D, which will take out the coarsest pieces and deliver them in the rear of the separator, while medium and fine material will fall through the scalping screen and flow down the middlings conduit W and enter the screening chamber Q above the fine screens, down which it will flow. As the material flows down the first fine screen its speed will accelerate. As it leaves the latter it will strike the adjacent dam Y and be deflected downwardly on to the next screen section, down which it will again start to flow. The operation will be repeated at the end of this section, so that the material will be intercepted and retarded after leaving each fine screen. The width of the fine screens will be limited to insure that the speed of flow of material down them will not exceed screening speed before the material is arrested and re-fed.

The screens will be stretched tight by the compression rods $c'$, and will be pressed upwardly against the impact posts by the stress of the springs. The hammers will strike the posts percussively and the posts will transmit the resulting impactive jarring to the wire clothing of the adjacent screen frames engaged by each, to prevent these from clogging.

For removal of the fine screens, the jarring mechanism and dams and posts will be moved bodily upward, and when lowered will press the fine screens downwardly against the springs to their proper positions. For cleaning or observation the doors will be opened or removed. The hopper will be moved to either end, the trough will be shifted and adjusted accordingly, and the revolving distributor will be driven in the direction necessary to the desired distribution. The jarring mechanism is reversibly mounted and may be driven from either end of the driving shaft, and the cams may be reversed to suit the direction of drive, or the belt may be crossed to provide for a reverse drive of the conveyor.

For packing or shipping, the feeder housing will be separated and the legs and feet collapsed for compactness. Both housings will be adjusted in inclination to give desired steepness for the fine screens.

It will be seen that this invention provides means which can be variously and advantageously availed of, and it will be understood that the invention is not limited to the particular details of construction or arrangement, or combination of features, set forth as constituting this preferred form, since it can be employed in whole or in part according to such modifications as circumstances or the judgment of those skilled in the art may dicate, without departing from the spirit of the invention.

The lifting means consist preferably of outside bars or racks $u'$ pivotally connected to the shaft $l'$ at one end and by a link $v'$ to the hinge $s'$ or bolt $f$ at the other end, and operated by a gear $w'$ from a shaft $x'$ having a ratchet $y'$ and a handle $z'$, as shown. A chain may be substituted for the gear when the bar $v'$ is pivoted to the bolt $f$ to allow for the consequent travel of the bar $u'$, but when the hinge $s'$ is used for this connection the bar $u'$ can be a sector and a gear can be used, as shown. This arrangement permits placing the lifting mechanism where it will not interfere with removal of the screens.

What I claim is:—

1. In combination, a casing comprising a bottom wall and affording a screening chamber, two similarly inclined resilient removable screens mounted in succession in said chamber and one below and in a lower plane than the other, similarly inclined stationary means between and as to which said screens are respectively resilient and removable affording a shelf receiving material discharged from said upper screen and diverting it onto said lower screen, and supporting means for said screens affording a passage between said screens and said bottom wall and removably sustaining said screens within said casing respectively in resilient relation to said stationary means.

2. In combination, a casing comprising a bottom wall and affording a screening chamber, two similarly inclined yieldingly mounted removable screens mounted in succession in said chamber and one below and in a lower plane than the other, similarly inclined stationary means between and as to which said screens are respectively yielding and removable affording a shelf receiving material discharged from said upper screen and diverting it onto said lower screen, and supporting means for said screens affording a passage between said screens and said bottom wall and yieldingly and removably sustaining said screens within said casing respectively in yielding relation to said stationary means.

3. In combination, a casing comprising a bottom wall and affording a screening chamber, two similarly inclined resilient removable screens mounted in succession in said chamber and one below and in a lower plane than the other, similarly inclined stationary means between and as to which said screens are respectively resilient and removable affording a shelf receiving material discharged from said upper screen and diverting it onto said lower screen, a dam or interceptor below and spaced apart from the lower edge of said upper screen and above and spaced apart from the upper part of said lower screen for arresting material flowing over the former and directing it toward the latter, and supporting means for said screens affording a passage between said screens and said bottom wall and removably sustaining said screens within said chamber respectively in resilient relation to said stationary means.

4. In combination, a main frame or casing affording a tubular screening chamber and having fixed side walls, a resilient removable downwardly inclined screen mounted in said chamber, a second similarly inclined removable screen disposed below and in a lower plane than and successive to said first mentioned screen, means mounted in fixed relation to said side walls supporting said screens, and movable or removable jarring means above said screens.

5. In combination, a frame or casing, two or more downwardly inclined screens mounted thereon and disposed in succession in different inclined planes one below another, means spaced apart from an upper one of said screens for intercepting material flowing thereover and directing it to the succeeding one of said screens, means for jarring said screens, and movable means on which said intercepting and jarring means are mounted.

6. In combination, a casing comprising a bottom wall and affording a screening chamber, an inclined resilient removable screen mounted in said chamber, similarly inclined stationary means above and as to which said screen is resilient and removable affording a shelf receiving material from above said screen and diverting it onto said screen, supporting means for said screen affording a passage between said screen and said bottom wall and removably sustaining said screen within said casing in resilient relation to said stationary means, an upper screen above and sustained by said stationary means and discharging onto said shelf material to be diverted onto said first screen, and means removably sustaining said upper screen from said stationary means.

7. In combination, a lower casing comprising a bottom wall and affording a screening chamber, an inclined resilient removable screen mounted in said chamber, similarly inclined stationary means above and as to which said screen is resilient and removable affording a shelf receiving material from above said screen and diverting it on to said screen, supporting means for said screen affording a passage between said screen and said bottom wall and removably sustaining said screen within said casing in resilient relation to said stationary means, an upper casing affording a screening chamber and mounted on said lower casing and communicating with said first chamber above said shelf, an upper inclined removable screen mounted in said upper casing and removably on and sustained by said stationary means and discharging onto said shelf material to be diverted onto said first screen, and means removably sustaining said upper screen from said stationary means.

8. In combination, a casing comprising a bottom wall and affording a screening chamber, an inclined resilient removable screen mounted in said chamber, similarly inclined stationary means above and as to which said screen is resilient and removable affording a shelf receiving material from above said screen and diverting it onto said screen, supporting means for said screen affording a passage between said screen and said bottom wall and removably sustaining said screen within said casing in resilient relation to said stationary means, an upper removable screen above and reversely inclined relatively to and sustained by said stationary means and discharging onto said shelf screened material to be diverted to the said first screen, and means removably sustaining said upper screen from said stationary means.

9. In combination, a casing comprising a bottom wall and affording a screening chamber, an inclined resilient removable screen mounted in said chamber, similarly inclined stationary means above and as to which said screen is resilient and removable affording a shelf receiving material from above said screen and diverting it onto said screen, supporting means for said screen affording a passage between said screen and said bottom wall and removably sustaining said screen within said casing in resilient relation to said stationary means, an upper removable screen above and reversely inclined to and sustained by said stationary means, upper stationary means below and similarly inclined to said upper screen and spaced above said shelf and receiving and diverting onto said shelf material passing through said upper screen to be diverted by said shelf onto said first screen, and means removably sustaining said upper screen from said stationary means.

10. In combination, a lower casing comprising a bottom wall and affording a screening chamber, an inclined resilient removable screen mounted in said chamber, similarly inclined stationary means above and as to which said screen is resilient and removable affording a shelf receiving material from above said screen and diverting it to the said screen, supporting means for said screen affording a passage between said screen and said bottom wall and removably sustaining said screen within said casing in resilient relation to said stationary means, an upper casing comprising a bottom wall spaced above and reversely inclined to said shelf for discharging onto said shelf material to be diverted onto said first screen, a removable upper screen for screening material passing to said upper wall removably mounted in said upper casing and above and reversely inclined to and sustained by said stationary means, and means removably sustaining said upper screen from said stationary means.

11. In combination, a casing comprising a bottom wall and affording a screening chamber, an inclined resilient removable screen mounted in said chamber, stationary means above and as to which said screen is resilient and removable affording a shelf above and similarly inclined to said screen receiving material from above said screen and diverting it onto said screen and affording a reversely inclined wall above said screen for diverting other material without said chamber, supporting means for said screen affording a passage between said screen and said bottom wall and removably sustaining said screen within said casing in resilient relation to said stationary means, an upper screen above and sustained by said stationary means and discharging onto said shelf material to be diverted onto said first screen and discharging onto said wall material to be diverted without said casing, and means removably sustaining said upper screen from said stationary means.

12. In combination, a casing comprising a bottom wall and affording a screening chamber, an inclined resilient removable screen mounted in said chamber and having upwardly extending flanges on its side edges similarly inclined stationary means above and as to which said screen is resilient and removable having a portion overlapping the upper edge of said screen extended between said flanges and affording a shelf receiving material from above said screen and diverting it onto said screen between said flanges, and having recessed portions at each side of said extended portion and opposite above and receiving said flanges respectively enclosing the upper end of said flanges, to divert material onto said screen between said flanges, and supporting means for said screen affording a passage between said screen and said bottom wall and removably sustaining said screen within said casing in resilient relation to said stationary means.

13. In combination, a casing having side walls, an inclined bottom wall, an inclined removable top, and affording a downwardly extending tubular screening chamber, a removable inclined screen mounted in said chamber, means above and for jarring said screen mounted on said casing, means at opposite sides of said screen for lifting said jarring mechanism away from said screen, and revolving means across said screen connecting said lifting means for operating them simultaneously.

14. In combination, a frame or casing affording a screening chamber and comprising side walls, a closed fixed bottom wall and an open top, an inclined screen yieldingly mounted in said screening chamber, springs mounted on said casing in fixed relation to said bottom wall and exerting an upward stress against said screen, a movable and removable post or abutment mounted on said casing engaging said screen and resisting an upward stress of said spring, jarring mechanism, a movable or removable frame on which said post is mounted, and means for impactively jarring said post.

15. In combination, a casing comprising fixed side walls and a downwardly inclined fixed bottom wall and affording a downwardly inclined screening chamber, two resilient removably inclined screens mounted therein, one below and successive to and mounted in a lower plane than the other, movable or removable jarring means above one of said screens, and a movable or removable cover above the other said screens.

16. In combination, a casing affording a downwardly inclined screening chamber, two resilient removable inclined screens therein disposed in succession and one below and in a lower plane than the other, jarring means for the upper one of said screens, a movable or removable frame or member mounted on said casing above and terminating at its lower part near the lower edge of the upper one of said screens and carrying said mechanism, and a succeeding movable or removable frame or member mounted on said casing below said first mentioned frame or member and above said second mentioned screen and affording a cover for said casing above said second screen.

17. In combination, a casing having a downwardly inclined top wall or cover and affording a downwardly extending screening chamber, a resilient screen mounted in said chamber, a second casing mounted above said first casing affording a downwardly extending screening chamber reversely inclined to and communicating with said first mentioned chamber and having a fixed bottom wall reversely inclined to and projecting above said top wall or cover and affording an open space above the latter, and jarring mechanism for said first mentioned screen disposed in said open space above said top wall or cover and below said reversely inclined bottom wall.

18. In combination, a casing affording a downwardly inclined screening chamber having fixed side walls, two resilient removable inclined screens mounted in said casing, one below and successive to and yieldingly disposed in a lower plane than the other, and a bar or member intermediate of the adjacent edges of said screens and below and sustaining the lower edge of the upper one and above and positioning the upper edge of the lower one thereof mounted in fixed relation to said side walls.

19. In combination, a casing having side walls and a downwardly inclined bottom wall and affording a downwardly extending screening chamber, a resilient inclined removable screen mounted in said chamber, jarring mechanism above said screen, and means for lifting said jarring mechanism above said casing connected to said mechanism outwardly of the sides of said screen and communicating below said screen from one to the other side thereof.

20. In combination, a casing affording an inclined screening chamber, separated screens in the upper and lower portions of said casing, retarding means between said screens for checking the descent of the material from the upper screen before the same is delivered to the lower screen comprising a shelf receiving material from the upper screen and a retarding plate for checking the downward travel of the material and diverting it to said shelf, jarring means above said shelf for said upper screen, and jarring means below said shelf and above said lower screen for jarring said lower screen.

21. In combination, a casing affording an inclined screening chamber, separated screens in the upper and lower portions of said casing, retarding means between said screens for checking the descent of the material from the upper screen before the same is delivered to the lower screen comprising a shelf receiving material from the upper screen and a retarding plate for checking the downward travel of the material and diverting it to said shelf, jarring means above said plate for jarring said upper screen, and jarring means below said plate and above said lower screen for jarring said lower screen.

22. In combination, a casing affording an inclined screen chamber, separated screens in the upper and lower portions of said casing, retarding means between said screens for checking the descent of the material from the upper screen before the same is delivered to the lower screen comprising a shelf receiving material from the upper screen and a retarding plate for checking the downward travel of the material and diverting it to said shelf, and jarring means straddling said shelf above and for jarring adjacent portions of said screens.

23. In combination, a casing affording an inclined screening chamber, separated screens in the upper and lower portions of said casing, retarding means between said screens for checking the descent of the material from the upper screen before the same is delivered to the lower screen comprising a shelf receiving material from the upper screen and a retarding plate for checking the downward travel of the material and diverting it to said shelf, and jarring means straddling said plate above and for jarring adjacent portions of said screens.

24. In combination, a casing affording an inclined screening chamber having side walls and an inclined bottom wall, separated yieldingly removable screens in the upper and lower portions of said casing, retarding means between said screens for checking the descent of the material from the upper screen before the same is delivered to the lower screen comprising a retarding plate for checking the downward travel of material discharged from the upper screen and diverting it to the lower screen, and means for sustaining said screens respectively comprising separated members below the adjacent edges of said screens respectively spaced above said bottom wall and affording a passage between them and the latter, and respectively opposite and sustaining the adjacent edge of said respective screens and affording between them a recess or space for the upper edge of said lower screen.

25. In combination, a casing affording an inclined screening chamber, a removable yieldingly mounted inclined screen in said chamber, means below and yieldingly and slidingly sustaining said screen in said chamber and exerting an upwardly and forwardly stress toward said screen, and means below and slidingly engaging the lower part of said screen movably sustaining it against downward movement in the direction of its inclination, and means for resisting the stress of said yielding means.

26. In combination, a casing affording an inclined screening chamber, a movably and removably mounted resilient inclined screen in said chamber, means above the upper horizontally extending edge of said screen for receiving material to be screened and diverting it on to said screen, means below said edge and slidingly sustaining said screen and affording an abutment above and spaced apart from said edge for limiting upward sliding of said screen relatively to said receiving means, and means below the lower horizontally extending edge of said screen affording an abutment removably sustaining said screen against downward movement in the direction of inclination.

27. In combination, a casing affording an inclined screening chamber, a movable and removable yieldingly mounted inclined screen in said chamber, means above the upper horizontally extending edge of said screen for receiving material to be screened and diverting it on to said screen, leaf springs below and spaced apart from said receiving means and beneath and acting upwardly against said screen for sustaining it extending longitudinally in the direction of inclination of said screen and slidingly sustaining it, and means as to which said screen is movable and removable below the lower edge of said screen and sustaining it against downward movement in the direction of its inclination.

28. In combination, a casing affording an inclined screening chamber, a removable yieldingly mounted inclined screen in said chamber, means above the upper horizontally extending edge of said screen for receiving material to be screened and diverting it on to said screen, leaf springs beneath and acting upwardly against said screen slidingly and removably sustaining it and exerting a stress toward it at right angles to the direction of its inclination, and means below the lower edge of said screen and as to which said screen is movable and removable sustaining it against downward movement in the direction of its inclination.

29. In combination, a casing affording an inclined screening chamber, a movable and removable inclined screen mounted in said chamber, means above said screen and beneath which said screen is upwardly slidable for delivering material to be screened on to said screen, means beneath and on which said screen is slidingly mounted, sustaining said screen transverse of its direction of inclination, and means below said screen and as to which said screen is movable and removable sustaining said screen in the direction of its inclination.

In witness whereof, I have hereunto signed my name in the presence of two subscribing witnesses.

GEORGE HOLT FRASER.

Witnesses:
 ANTONIO BUONO,
 SIGVARD G. HELLEM.